(12) United States Patent
Travis et al.

(10) Patent No.: US 9,052,414 B2
(45) Date of Patent: Jun. 9, 2015

(54) VIRTUAL IMAGE DEVICE

(75) Inventors: Adrian Travis, Seattle, WA (US); Jaron Z. Lanier, Berkeley, CA (US); Joel S. Kollin, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 340 days.

(21) Appl. No.: 13/367,812

(22) Filed: Feb. 7, 2012

(65) Prior Publication Data

US 2013/0201094 A1 Aug. 8, 2013

(51) Int. Cl.
| | |
|---|---|
| *G03B 21/00* | (2006.01) |
| *G02B 6/00* | (2006.01) |
| *G02B 27/22* | (2006.01) |
| *G02B 27/44* | (2006.01) |
| *G09G 5/00* | (2006.01) |
| *H04N 9/31* | (2006.01) |
| *G02B 27/01* | (2006.01) |

(52) U.S. Cl.
CPC ................ *G02B 6/00* (2013.01); *H04N 9/3108* (2013.01); *H04N 9/3197* (2013.01); *G02B 27/22* (2013.01); *G02B 27/44* (2013.01); *G09G 5/00* (2013.01); *G02B 2027/0174* (2013.01); *G02B 2027/0123* (2013.01); *G02B 2027/0178* (2013.01); *G02B 2027/0187* (2013.01)

(58) Field of Classification Search
CPC .................... G02F 1/133504; G02F 1/133526; H04N 9/3108; H04N 9/3197
USPC .......... 353/7–8, 38, 97, 99; 359/196.1, 201.1, 359/201.2, 223.1, 224.1, 489.06, 566, 594; 349/5, 7–9, 18, 19, 33, 41, 56, 74, 112
See application file for complete search history.

(56) References Cited

U.S. PATENT DOCUMENTS

| | | | |
|---|---|---|---|
| 4,046,975 | A | 9/1977 | Seeger, Jr. |
| 4,065,649 | A | 12/1977 | Carter et al. |
| 4,239,338 | A | 12/1980 | Borrelli et al. |
| 4,243,861 | A | 1/1981 | Strandwitz |
| 4,302,648 | A | 11/1981 | Sado et al. |

(Continued)

FOREIGN PATENT DOCUMENTS

| | | |
|---|---|---|
| CN | 1440513 | 9/2003 |
| EP | 0271956 | 6/1988 |

(Continued)

OTHER PUBLICATIONS

International Search Report and Written Opinion, Application No. PCT/US2013/051421, Dec. 6, 2013, 10 pages.

(Continued)

*Primary Examiner* — Sultan Chowdhury
(74) *Attorney, Agent, or Firm* — Jeremy Snodgrass; Judy Yee; Micky Minhas

(57) ABSTRACT

This document describes various apparatuses embodying, and techniques for implementing, a virtual image device. The virtual image device includes a projector and a lens configured to generate a virtual image as well as two diffraction gratings, substantially orthogonally-oriented to each other, that act to increase a field-of-view of the virtual image. The virtual image device can be implemented as a pair of eyeglasses and controlled to generate the virtual image in front of lenses of the eyeglasses so that a wearer of the eyeglasses, looking through the lenses of the eyeglasses, sees the virtual image.

20 Claims, 7 Drawing Sheets

(56) References Cited

U.S. PATENT DOCUMENTS

| | | | |
|---|---|---|---|
| 4,317,013 A | 2/1982 | Larson |
| 4,365,130 A | 12/1982 | Christensen |
| 4,492,829 A | 1/1985 | Rodrique |
| 4,527,021 A | 7/1985 | Morikawa et al. |
| 4,559,426 A | 12/1985 | Van Zeeland et al. |
| 4,576,436 A | 3/1986 | Daniel |
| 4,588,187 A | 5/1986 | Dell |
| 4,607,147 A | 8/1986 | Ono et al. |
| 4,615,579 A | 10/1986 | Whitehead |
| 4,651,133 A | 3/1987 | Ganesan et al. |
| 5,220,521 A | 6/1993 | Kikinis |
| 5,283,559 A | 2/1994 | Kalendra et al. |
| 5,331,443 A | 7/1994 | Stanisci |
| 5,339,382 A | 8/1994 | Whitehead |
| 5,406,415 A | 4/1995 | Kelly |
| 5,548,477 A | 8/1996 | Kumar et al. |
| 5,558,577 A | 9/1996 | Kato |
| 5,681,220 A | 10/1997 | Bertram et al. |
| 5,745,376 A | 4/1998 | Barker et al. |
| 5,748,114 A | 5/1998 | Koehn |
| 5,781,406 A | 7/1998 | Hunte |
| 5,807,175 A | 9/1998 | Davis et al. |
| 5,818,361 A | 10/1998 | Acevedo |
| 5,828,770 A | 10/1998 | Leis et al. |
| 5,861,990 A | 1/1999 | Tedesco |
| 5,874,697 A | 2/1999 | Selker et al. |
| 5,926,170 A | 7/1999 | Oba |
| 5,971,635 A | 10/1999 | Wise |
| 5,999,147 A | 12/1999 | Teitel |
| 6,002,389 A | 12/1999 | Kasser |
| 6,005,209 A | 12/1999 | Burleson et al. |
| 6,012,714 A | 1/2000 | Worley et al. |
| 6,040,823 A | 3/2000 | Seffernick et al. |
| 6,044,717 A | 4/2000 | Biegelsen et al. |
| 6,046,857 A | 4/2000 | Morishima |
| 6,061,644 A | 5/2000 | Leis |
| 6,178,443 B1 | 1/2001 | Lin |
| 6,195,136 B1 * | 2/2001 | Handschy et al. ............... 349/5 |
| 6,232,934 B1 | 5/2001 | Heacock et al. |
| 6,254,105 B1 | 7/2001 | Rinde et al. |
| 6,279,060 B1 | 8/2001 | Luke et al. |
| 6,300,986 B1 | 10/2001 | Travis |
| 6,329,617 B1 | 12/2001 | Burgess |
| 6,344,791 B1 | 2/2002 | Armstrong |
| 6,353,503 B1 | 3/2002 | Spitzer et al. |
| 6,362,861 B1 | 3/2002 | Hertz et al. |
| 6,380,497 B1 | 4/2002 | Hashimoto et al. |
| 6,437,682 B1 | 8/2002 | Vance |
| 6,469,755 B1 | 10/2002 | Adachi et al. |
| 6,511,378 B1 | 1/2003 | Bhatt et al. |
| 6,532,147 B1 | 3/2003 | Christ, Jr. |
| 6,543,949 B1 | 4/2003 | Ritchey et al. |
| 6,565,439 B2 | 5/2003 | Shinohara et al. |
| 6,600,121 B1 | 7/2003 | Olodort et al. |
| 6,603,408 B1 | 8/2003 | Gaba |
| 6,617,536 B2 | 9/2003 | Kawaguchi |
| 6,685,369 B2 | 2/2004 | Lien |
| 6,704,864 B1 | 3/2004 | Philyaw |
| 6,721,019 B2 | 4/2004 | Kono et al. |
| 6,725,318 B1 | 4/2004 | Sherman et al. |
| 6,774,888 B1 | 8/2004 | Genduso |
| 6,776,546 B2 | 8/2004 | Kraus et al. |
| 6,784,869 B1 | 8/2004 | Clark et al. |
| 6,795,146 B2 | 9/2004 | Dozov et al. |
| 6,813,143 B2 | 11/2004 | Makela |
| 6,819,316 B2 | 11/2004 | Schulz et al. |
| 6,833,955 B2 * | 12/2004 | Niv ............... 359/566 |
| 6,847,488 B2 | 1/2005 | Travis |
| 6,856,506 B2 | 2/2005 | Doherty et al. |
| 6,861,961 B2 | 3/2005 | Sandbach et al. |
| 6,914,197 B2 | 7/2005 | Doherty et al. |
| 6,950,950 B2 | 9/2005 | Sawyers et al. |
| 6,970,957 B1 | 11/2005 | Oshins et al. |
| 6,976,799 B2 | 12/2005 | Kim et al. |
| 7,007,238 B2 | 2/2006 | Glaser |
| 7,025,908 B1 | 4/2006 | Hayashi et al. |
| 7,051,149 B2 | 5/2006 | Wang et al. |
| 7,058,252 B2 * | 6/2006 | Woodgate et al. ............... 385/16 |
| 7,066,634 B2 | 6/2006 | Kitamura et al. |
| 7,091,436 B2 | 8/2006 | Serban |
| 7,101,048 B2 | 9/2006 | Travis |
| 7,106,222 B2 | 9/2006 | Ward et al. |
| 7,123,292 B1 | 10/2006 | Seeger et al. |
| 7,152,985 B2 | 12/2006 | Benitez et al. |
| 7,194,662 B2 | 3/2007 | Do et al. |
| 7,199,931 B2 | 4/2007 | Boettiger et al. |
| 7,213,991 B2 | 5/2007 | Chapman et al. |
| 7,218,830 B2 | 5/2007 | Iimura |
| 7,277,087 B2 | 10/2007 | Hill et al. |
| 7,400,805 B2 | 7/2008 | Abu-Ageel |
| 7,447,934 B2 | 11/2008 | Dasari et al. |
| 7,469,386 B2 | 12/2008 | Bear et al. |
| 7,499,037 B2 | 3/2009 | Lube |
| 7,499,216 B2 | 3/2009 | Niv et al. |
| 7,502,803 B2 | 3/2009 | Culter et al. |
| 7,515,143 B2 | 4/2009 | Keam et al. |
| 7,542,052 B2 | 6/2009 | Solomon et al. |
| 7,558,594 B2 | 7/2009 | Wilson |
| 7,559,834 B1 | 7/2009 | York |
| 7,561,131 B2 | 7/2009 | Ijzerman et al. |
| 7,636,921 B2 | 12/2009 | Louie |
| 7,643,213 B2 | 1/2010 | Boettiger et al. |
| 7,656,392 B2 | 2/2010 | Bolender |
| 7,733,326 B1 | 6/2010 | Adiseshan |
| 7,777,972 B1 | 8/2010 | Chen et al. |
| 7,782,342 B2 | 8/2010 | Koh |
| 7,813,715 B2 | 10/2010 | McKillop et al. |
| 7,855,716 B2 | 12/2010 | McCreary et al. |
| 7,884,807 B2 | 2/2011 | Hovden et al. |
| D636,397 S | 4/2011 | Green |
| 7,918,559 B2 | 4/2011 | Tesar |
| 7,928,964 B2 | 4/2011 | Kolmykov-Zotov et al. |
| 7,945,717 B2 | 5/2011 | Rivalsi |
| 7,967,462 B2 | 6/2011 | Ogiro et al. |
| 7,973,771 B2 | 7/2011 | Geaghan |
| 7,978,281 B2 | 7/2011 | Vergith et al. |
| 8,035,614 B2 | 10/2011 | Bell et al. |
| 8,035,624 B2 | 10/2011 | Bell et al. |
| 8,053,688 B2 | 11/2011 | Conzola et al. |
| 8,065,624 B2 | 11/2011 | Morin et al. |
| 8,069,356 B2 | 11/2011 | Rathi et al. |
| RE42,992 E | 12/2011 | David |
| 8,102,362 B2 | 1/2012 | Ricks et al. |
| 8,115,718 B2 | 2/2012 | Chen et al. |
| 8,130,203 B2 | 3/2012 | Westerman |
| 8,154,524 B2 | 4/2012 | Wilson et al. |
| D659,139 S | 5/2012 | Gengler |
| 8,169,421 B2 | 5/2012 | Wright et al. |
| 8,220,929 B2 * | 7/2012 | Miyawaki et al. ............... 353/7 |
| 8,229,509 B2 | 7/2012 | Paek et al. |
| 8,229,522 B2 | 7/2012 | Kim et al. |
| 8,249,263 B2 | 8/2012 | Cragun |
| 8,310,768 B2 | 11/2012 | Lin et al. |
| 8,345,920 B2 | 1/2013 | Ferren et al. |
| 8,416,206 B2 | 4/2013 | Carpendale et al. |
| 8,466,902 B2 | 6/2013 | Boer et al. |
| 8,582,206 B2 | 11/2013 | Travis |
| 8,717,664 B2 | 5/2014 | Wang et al. |
| 8,749,529 B2 | 6/2014 | Powell et al. |
| 9,019,615 | 4/2015 | Travis |
| 2002/0134828 A1 | 9/2002 | Sandbach et al. |
| 2003/0165017 A1 | 9/2003 | Amitai |
| 2003/0197687 A1 | 10/2003 | Shetter |
| 2004/0052506 A1 | 3/2004 | Togino |
| 2004/0174709 A1 | 9/2004 | Buelow, II et al. |
| 2004/0258924 A1 | 12/2004 | Berger et al. |
| 2004/0268000 A1 | 12/2004 | Barker et al. |
| 2005/0001957 A1 * | 1/2005 | Amimori et al. ............... 349/112 |
| 2005/0002073 A1 | 1/2005 | Nakamura et al. |
| 2005/0057515 A1 | 3/2005 | Bathiche |
| 2005/0059489 A1 | 3/2005 | Kim |
| 2005/0100690 A1 | 5/2005 | Mayer et al. |
| 2005/0146512 A1 | 7/2005 | Hill et al. |
| 2005/0264653 A1 | 12/2005 | Starkweather et al. |

(56) References Cited

U.S. PATENT DOCUMENTS

| | | |
|---|---|---|
| 2005/0264988 A1 | 12/2005 | Nicolosi |
| 2006/0002101 A1 | 1/2006 | Wheatley et al. |
| 2006/0028400 A1 | 2/2006 | Lapstun et al. |
| 2006/0085658 A1 | 4/2006 | Allen et al. |
| 2006/0125799 A1 | 6/2006 | Hillis et al. |
| 2006/0154725 A1 | 7/2006 | Glaser et al. |
| 2006/0156415 A1 | 7/2006 | Rubinstein et al. |
| 2006/0181514 A1 | 8/2006 | Newman |
| 2006/0195522 A1 | 8/2006 | Miyazaki |
| 2006/0227393 A1 | 10/2006 | Herloski |
| 2006/0238550 A1 | 10/2006 | Page |
| 2006/0239006 A1 | 10/2006 | Chaves et al. |
| 2006/0279501 A1 | 12/2006 | Lu et al. |
| 2007/0002587 A1 | 1/2007 | Miyashita |
| 2007/0047260 A1 | 3/2007 | Lee et al. |
| 2007/0062089 A1 | 3/2007 | Homer et al. |
| 2007/0072474 A1 | 3/2007 | Beasley et al. |
| 2007/0182663 A1 | 8/2007 | Biech |
| 2007/0189667 A1 | 8/2007 | Wakita et al. |
| 2007/0234420 A1 | 10/2007 | Novotney et al. |
| 2007/0236408 A1 | 10/2007 | Yamaguchi et al. |
| 2007/0247432 A1 | 10/2007 | Oakley |
| 2007/0260892 A1 | 11/2007 | Paul et al. |
| 2007/0279744 A1 | 12/2007 | Fujimoto |
| 2007/0283179 A1 | 12/2007 | Burnett et al. |
| 2008/0005423 A1 | 1/2008 | Jacobs et al. |
| 2008/0080166 A1 | 4/2008 | Duong et al. |
| 2008/0088593 A1 | 4/2008 | Smoot |
| 2008/0094398 A1 | 4/2008 | Ng et al. |
| 2008/0104437 A1 | 5/2008 | Lee |
| 2008/0122803 A1 | 5/2008 | Izadi et al. |
| 2008/0150913 A1 | 6/2008 | Bell et al. |
| 2008/0151478 A1 | 6/2008 | Chern |
| 2008/0158185 A1 | 7/2008 | Westerman |
| 2008/0179507 A2 | 7/2008 | Han |
| 2008/0225205 A1 | 9/2008 | Travis |
| 2008/0238884 A1 | 10/2008 | Harish |
| 2008/0253822 A1 | 10/2008 | Matias |
| 2008/0316002 A1 | 12/2008 | Brunet et al. |
| 2008/0320190 A1 | 12/2008 | Lydon et al. |
| 2009/0009476 A1 | 1/2009 | Daley, III |
| 2009/0033623 A1 | 2/2009 | Lin |
| 2009/0067156 A1 | 3/2009 | Bonnett et al. |
| 2009/0073957 A1 | 3/2009 | Newland et al. |
| 2009/0096738 A1 | 4/2009 | Chen et al. |
| 2009/0140985 A1 | 6/2009 | Liu |
| 2009/0142020 A1 | 6/2009 | Van Ostrand et al. |
| 2009/0189974 A1 | 7/2009 | Deering |
| 2009/0200384 A1 | 8/2009 | Masalkar |
| 2009/0251008 A1 | 10/2009 | Sugaya |
| 2009/0262492 A1 | 10/2009 | Whitchurch et al. |
| 2009/0303204 A1 | 12/2009 | Nasiri et al. |
| 2009/0320244 A1 | 12/2009 | Lin |
| 2009/0321490 A1 | 12/2009 | Groene et al. |
| 2010/0001963 A1 | 1/2010 | Doray et al. |
| 2010/0026656 A1 | 2/2010 | Hotelling et al. |
| 2010/0038821 A1 | 2/2010 | Jenkins et al. |
| 2010/0045633 A1 | 2/2010 | Gettemy |
| 2010/0051432 A1 | 3/2010 | Lin et al. |
| 2010/0053534 A1 | 3/2010 | Hsieh et al. |
| 2010/0053771 A1 | 3/2010 | Travis et al. |
| 2010/0072351 A1 | 3/2010 | Mahowald |
| 2010/0077237 A1 | 3/2010 | Sawyers |
| 2010/0085321 A1 | 4/2010 | Pundsack |
| 2010/0102206 A1 | 4/2010 | Cazaux et al. |
| 2010/0103112 A1 | 4/2010 | Yoo et al. |
| 2010/0149073 A1 | 6/2010 | Chaum et al. |
| 2010/0149100 A1 | 6/2010 | Meiby |
| 2010/0149111 A1 | 6/2010 | Olien |
| 2010/0149117 A1 | 6/2010 | Chien et al. |
| 2010/0161522 A1 | 6/2010 | Tirpak et al. |
| 2010/0164857 A1 | 7/2010 | Liu et al. |
| 2010/0171891 A1 | 7/2010 | Kaji et al. |
| 2010/0174421 A1 | 7/2010 | Tsai et al. |
| 2010/0177388 A1 | 7/2010 | Cohen et al. |
| 2010/0180063 A1 | 7/2010 | Ananny et al. |
| 2010/0188299 A1 | 7/2010 | Rinehart et al. |
| 2010/0206614 A1 | 8/2010 | Park et al. |
| 2010/0214659 A1* | 8/2010 | Levola ......................... 359/566 |
| 2010/0222110 A1 | 9/2010 | Kim et al. |
| 2010/0250988 A1 | 9/2010 | Okuda et al. |
| 2010/0274932 A1 | 10/2010 | Kose |
| 2010/0279768 A1 | 11/2010 | Huang et al. |
| 2010/0282953 A1 | 11/2010 | Tam |
| 2010/0284085 A1* | 11/2010 | Laakkonen ................... 359/575 |
| 2010/0289457 A1 | 11/2010 | Onnerud et al. |
| 2010/0295812 A1 | 11/2010 | Burns et al. |
| 2010/0296163 A1 | 11/2010 | Saarikko |
| 2010/0302378 A1 | 12/2010 | Marks et al. |
| 2010/0302469 A1* | 12/2010 | Yue et al. ........................ 349/18 |
| 2010/0306538 A1 | 12/2010 | Thomas et al. |
| 2010/0308778 A1 | 12/2010 | Yamazaki et al. |
| 2010/0308844 A1 | 12/2010 | Day et al. |
| 2010/0315348 A1 | 12/2010 | Jellicoe et al. |
| 2010/0325155 A1 | 12/2010 | Skinner et al. |
| 2011/0002577 A1 | 1/2011 | Van Ostrand |
| 2011/0007047 A1 | 1/2011 | Fujioka et al. |
| 2011/0012873 A1 | 1/2011 | Prest et al. |
| 2011/0019123 A1 | 1/2011 | Prest et al. |
| 2011/0031287 A1 | 2/2011 | Le Gette et al. |
| 2011/0032215 A1 | 2/2011 | Sirotich et al. |
| 2011/0035209 A1 | 2/2011 | Macfarlane |
| 2011/0037721 A1 | 2/2011 | Cranfill et al. |
| 2011/0043479 A1 | 2/2011 | van Aerle et al. |
| 2011/0043990 A1 | 2/2011 | Mickey et al. |
| 2011/0044579 A1 | 2/2011 | Travis et al. |
| 2011/0060926 A1 | 3/2011 | Brooks et al. |
| 2011/0069148 A1 | 3/2011 | Jones et al. |
| 2011/0072391 A1 | 3/2011 | Hanggie et al. |
| 2011/0074688 A1 | 3/2011 | Hull et al. |
| 2011/0096035 A1 | 4/2011 | Shen |
| 2011/0102326 A1 | 5/2011 | Casparian et al. |
| 2011/0122071 A1 | 5/2011 | Powell |
| 2011/0134032 A1 | 6/2011 | Chiu et al. |
| 2011/0163955 A1 | 7/2011 | Nasiri et al. |
| 2011/0164370 A1 | 7/2011 | McClure et al. |
| 2011/0167181 A1 | 7/2011 | Minoo et al. |
| 2011/0167287 A1 | 7/2011 | Walsh et al. |
| 2011/0167391 A1 | 7/2011 | Momeyer et al. |
| 2011/0169778 A1 | 7/2011 | Nungester et al. |
| 2011/0170289 A1 | 7/2011 | Allen et al. |
| 2011/0179864 A1 | 7/2011 | Raasch et al. |
| 2011/0184646 A1 | 7/2011 | Wong et al. |
| 2011/0193787 A1 | 8/2011 | Morishige et al. |
| 2011/0197156 A1 | 8/2011 | Strait et al. |
| 2011/0205372 A1 | 8/2011 | Miramontes |
| 2011/0216039 A1 | 9/2011 | Chen et al. |
| 2011/0227913 A1 | 9/2011 | Hyndman |
| 2011/0234535 A1 | 9/2011 | Hung et al. |
| 2011/0235179 A1 | 9/2011 | Simmonds |
| 2011/0242440 A1 | 10/2011 | Noma et al. |
| 2011/0242670 A1 | 10/2011 | Simmonds |
| 2011/0248920 A1 | 10/2011 | Larsen |
| 2011/0290686 A1 | 12/2011 | Huang |
| 2011/0291993 A1 | 12/2011 | Miyazaki |
| 2011/0297566 A1 | 12/2011 | Gallagher et al. |
| 2011/0304577 A1 | 12/2011 | Brown |
| 2011/0304815 A1 | 12/2011 | Newell |
| 2011/0316807 A1 | 12/2011 | Corrion |
| 2011/0317399 A1 | 12/2011 | Hsu |
| 2012/0007821 A1 | 1/2012 | Zaliva |
| 2012/0023459 A1 | 1/2012 | Westerman |
| 2012/0024682 A1 | 2/2012 | Huang et al. |
| 2012/0044179 A1 | 2/2012 | Hudson |
| 2012/0047368 A1 | 2/2012 | Chinn et al. |
| 2012/0050975 A1 | 3/2012 | Garelli et al. |
| 2012/0062850 A1 | 3/2012 | Travis |
| 2012/0068919 A1 | 3/2012 | Lauder et al. |
| 2012/0075249 A1 | 3/2012 | Hoch |
| 2012/0092279 A1 | 4/2012 | Martin |
| 2012/0094257 A1 | 4/2012 | Pillischer et al. |
| 2012/0099749 A1 | 4/2012 | Rubin et al. |
| 2012/0102436 A1 | 4/2012 | Nurmi |
| 2012/0102438 A1 | 4/2012 | Robinson et al. |

(56) References Cited

U.S. PATENT DOCUMENTS

| | | |
|---|---|---|
| 2012/0113031 A1 | 5/2012 | Lee et al. |
| 2012/0113223 A1 | 5/2012 | Hilliges et al. |
| 2012/0117409 A1 | 5/2012 | Lee et al. |
| 2012/0127118 A1 | 5/2012 | Nolting et al. |
| 2012/0140396 A1 | 6/2012 | Zeliff et al. |
| 2012/0145525 A1 | 6/2012 | Ishikawa |
| 2012/0146943 A1 | 6/2012 | Fairley et al. |
| 2012/0162088 A1 | 6/2012 | van Lieshout et al. |
| 2012/0162126 A1 | 6/2012 | Yuan et al. |
| 2012/0162693 A1 | 6/2012 | Ito |
| 2012/0170284 A1 | 7/2012 | Shedletsky |
| 2012/0182242 A1 | 7/2012 | Lindahl et al. |
| 2012/0182743 A1 | 7/2012 | Chou |
| 2012/0188243 A1 | 7/2012 | Fujii et al. |
| 2012/0194448 A1 | 8/2012 | Rothkopf |
| 2012/0195063 A1 | 8/2012 | Kim et al. |
| 2012/0200532 A1 | 8/2012 | Powell et al. |
| 2012/0224073 A1 | 9/2012 | Miyahara |
| 2012/0243102 A1 | 9/2012 | Takeda et al. |
| 2012/0243204 A1 | 9/2012 | Robinson |
| 2012/0246377 A1 | 9/2012 | Bhesania |
| 2012/0256959 A1 | 10/2012 | Ye et al. |
| 2012/0268912 A1 | 10/2012 | Minami et al. |
| 2012/0274811 A1 | 11/2012 | Bakin |
| 2012/0300275 A1 | 11/2012 | Vilardell et al. |
| 2013/0027354 A1 | 1/2013 | Yabuta et al. |
| 2013/0063873 A1 | 3/2013 | Wodrich et al. |
| 2013/0106813 A1 | 5/2013 | Hotelling et al. |
| 2013/0107572 A1 | 5/2013 | Holman et al. |
| 2013/0120760 A1 | 5/2013 | Raguin et al. |
| 2013/0181926 A1 | 7/2013 | Lim |
| 2013/0207896 A1 | 8/2013 | Robinson et al. |
| 2013/0222353 A1 | 8/2013 | Large |
| 2013/0229357 A1 | 9/2013 | Powell |
| 2013/0265220 A1 | 10/2013 | Fleischmann et al. |
| 2013/0329301 A1 | 12/2013 | Travis |
| 2013/0332628 A1 | 12/2013 | Panay |
| 2014/0022629 A1 | 1/2014 | Powell |
| 2014/0098085 A1 | 4/2014 | Lee |
| 2014/0168131 A1 | 6/2014 | Rihn |
| 2014/0233237 A1 | 8/2014 | Lutian |
| 2014/0254032 A1 | 9/2014 | Chen |

FOREIGN PATENT DOCUMENTS

| | | |
|---|---|---|
| EP | 2353978 | 8/2011 |
| EP | 2381290 | 10/2011 |
| JP | 10301055 | 11/1998 |
| JP | 10326124 | 12/1998 |
| JP | 2001174746 | 6/2001 |
| JP | 2009003053 | 1/2009 |
| JP | 2009122551 | 6/2009 |
| KR | 20110064265 | 6/2011 |
| WO | WO-9964784 | 12/1999 |
| WO | WO-0079327 | 12/2000 |
| WO | WO-2011016200 | 2/2011 |
| WO | WO-2012063410 | 5/2012 |

OTHER PUBLICATIONS

International Search Report and Written Opinion, Application No. PCT/US2013/063156, Dec. 5, 2013, 9 pages.
Non-Final Office Action, U.S. Appl. No. 13/409,967, Dec. 10, 2013, 5 pages.
Non-Final Office Action, U.S. Appl. No. 13/408,257, Dec. 5, 2013, 13 pages.
Notice of Allowance, U.S. Appl. No. 13/409,967, Feb. 14, 2014, 4 pages.
Restriction Requirement, U.S. Appl. No. 13/494,722, Dec. 20, 2013, 6 pages.
"Accessing Device Sensors", retrieved from <https://developer.palm.com/content/api/dev-guide/pdk/accessing-device-sensors.html> on May 25, 2012, 4 pages.
"ACPI Docking for Windows Operating Systems", Retrieved from: <http://www.scritube.com/limba/engleza/software/ACPI-Docking-for-Windows-Opera331824193.php> on Jul. 6, 2012, 10 pages.
"Cirago Slim Case®—Protective case with built-in kickstand for your iPhone 5®", Retrieved from <http://cirago.com/wordpress/wp-content/uploads/2012/10/ipc1500brochure1.pdf> on Jan. 29, 2013, 1 page.
"First One Handed Fabric Keyboard with Bluetooth Wireless Technology", Retrieved from: <http://press.xtvworld.com/article3817.html> on May 8, 2012,(Jan. 6, 2005), 2 pages.
"Force and Position Sensing Resistors: An Emerging Technology", *Interlink Electronics*, Available at <http://staff.science.uva.nl/~vlaander/docu/FSR/An_Exploring_Technology.pdf>,(Feb. 1990), pp. 1-6.
"Frogpad Introduces Weareable Fabric Keyboard with Bluetooth Technology", Retrieved from: <http://www.geekzone.co.nz/content.asp?contentid=3898> on May 7, 2012,(Jan. 7, 2005), 3 pages.
"Incipio LG G-Slate Premium Kickstand Case—Black Nylon", Retrieved from: <http://www.amazon.com/Incipio-G-Slate-Premium-Kickstand-Case/dp/B004ZKP916> on May 8, 2012, 4 pages.
International Search Report and Written Opinion, International Application No. PCT/US2011/050471, (Apr. 9, 2012), 8 pages.
"Membrane Keyboards & Membrane Keypads", Retrieved from: <http://www.pannam.com/> on May 9, 2012,(Mar. 4, 2009), 2 pages.
"Microsoft Reveals Futuristic 3D Virtual HoloDesk Patent", Retrieved from <http://www.patentbolt.com/2012/05/microsoft-reveals-futuristic-3d-virtual-holodesk-patent.htmlt> on May 28, 2012, (May 23, 2012), 9 pages.
"Motion Sensors", *Android Developers*, retrieved from <http://developer.android.com/guide/topics/sensors/sensors_motion.html> on May 25, 2012, 7 pages.
Non-Final Office Action, U.S. Appl. No. 12/882,994, (Feb. 1, 2013),17 pages.
Non-Final Office Action, U.S. Appl. No. 13/471,001, (Feb. 19, 2013),15 pages.
Non-Final Office Action, U.S. Appl. No. 13/471,139, (Mar. 21, 2013),12 pages.
Non-Final Office Action, U.S. Appl. No. 13/471,202, (Feb. 11, 2013),10 pages.
Non-Final Office Action, U.S. Appl. No. 13/471,336, (Jan. 18, 2013),14 pages.
Non-Final Office Action, U.S. Appl. No. 13/651,195, (Jan. 2, 2013),14 pages.
Non-Final Office Action, U.S. Appl. No. 13/651,232, (Jan. 17, 2013),15 pages.
Non-Final Office Action, U.S. Appl. No. 13/651,272, (Feb. 12, 2013),10 pages.
Non-Final Office Action, U.S. Appl. No. 13/651,287, (Jan. 29, 2013),13 pages.
Non-Final Office Action, U.S. Appl. No. 13/651,304, (Mar. 22, 2013), 9 pages.
Non-Final Office Action, U.S. Appl. No. 13/651,327, (Mar. 22, 2013), 6 pages.
Non-Final Office Action, U.S. Appl. No. 13/651,871, (Mar. 18, 2013),14 pages.
Non-Final Office Action, U.S. Appl. No. 13/651,976, (Feb. 22, 2013),16 pages.
Non-Final Office Action, U.S. Appl. No. 13/653,321, (Feb. 1, 2013),13 pages.
Non-Final Office Action, U.S. Appl. No. 13/653,682, (Feb. 7, 2013),11 pages.
Notice of Allowance, U.S. Appl. No. 13/470,633, (Mar. 22, 2013), 7 pages.
"Position Sensors", Android Developers, retrieved from <http://developer.android.com/guide/topics/sensors/sensors_position.html> on May 25, 2012, 5 pages.
Restriction Requirement, U.S. Appl. No. 13/471,139, (Jan. 17, 2013), 7 pages.
Restriction Requirement, U.S. Appl. No. 13/651,304, (Jan. 18, 2013), 7 pages.
Restriction Requirement, U.S. Appl. No. 13/651,726, (Feb. 22, 2013), 6 pages.

(56) References Cited

OTHER PUBLICATIONS

Restriction Requirement, U.S. Appl. No. 13/651,871, (Feb. 7, 2013), 6 pages.
"SoIRxTM E-Series Multidirectional Phototherapy ExpandableTM 2-Bulb Full Body Panel System", Retrieved from: < http://www.solarcsystems.com/us_multidirectional_uv_light_therapy_1_intro.html > on Jul. 25, 2012,(2011), 4 pages.
"The Microsoft Surface Tablets Comes With Impressive Design and Specs", Retrieved from <http://microsofttabletreview.com/the-microsoft-surface-tablets-comes-with-impressive-design-and-specs> on Jan. 30, 2013, (Jun. 2012), 2 pages.
"Tilt Shift Lenses: Perspective Control", retrieved from http://www.cambridgeincolour.com/tutorials/tilt-shift-lenses1.htm, (Mar. 28, 2008),11 Pages.
"Virtualization Getting Started Guide", *Red Hat Enterprise Linux 6, Edition 0.2*, retrieved from <http://docs.redhat.com/docs/en-US/Red_Hat_Enterprise_Linux/6/html-single/Virtualization_Getting_Started_Guide/index.html> on Jun. 13, 2012, 24 pages.
"What is Active Alignment?", http://www.kasalis.com/active_alignment.html, retrieved on Nov. 22, 2012, 2 Pages.
Bert, et al., "Passive Matrix Addressing of Electrophoretic Image Display", *Conference on International Display Research Conference*, Retrieved from <http://www.cmst.be/publi/eurodisplay2002_s14-1.pdf>, (Oct. 1, 2002), 4 pages.
Block, Steve et al., "DeviceOrientation Event Specification", *W3C, Editor's Draft*, retrieved from <https://developer.palm.com/content/api/dev-guide/pdk/accessing-device-sensors.html> on May 25, 2012,(Jul. 12, 2011),14 pages.
Brown, Rich "Microsoft Shows Off Pressure-Sensitive Keyboard", retrieved from <http://news.cnet.com/8301-17938_105-10304792-1.html> on May 7, 2012, (Aug. 6, 2009), 2 pages.
Burge, et al., "Determination of off-axis aberrations of imaging systems using on-axis measurements", *SPIE Proceeding*, Retrieved from <http://www.loft.opics.arizona.edu/documents/journal_articles/Jim_Burge_Determination_of_off-axis_aberrations_of_imaging_systems_using_on-axis_measurements.pdf>,(Sep. 21, 2011),10 pages.
Butler, Alex et al., "SideSight: Multi-"touch" Interaction around Small Devices", *In the proceedings of the 21st annual ACM symposium on User interface software and technology.*, retrieved from <http://research.microsoft.com/pubs/132534/sidesight_crv3.pdf> on May 29, 2012,(Oct. 19, 2008), 4 pages.
Chang, Jee-Gong et al., "Optical Design and Analysis of LCD Backlight Units Using ASAP", *Optical Engineering*, Available at <http://www.opticsvalley.com/resources/kbasePDF/ma_oe_001_optical_design.pdf>,(Jun. 2003),15 pages.
Crider, Michael "Sony Slate Concept Tablet "Grows" a Kickstand", Retrieved from: <http://androidcommunity.com/sony-slate-concept-tablet-grows-a-kickstand-20120116/> on May 4, 2012,(Jan. 16, 2012), 9 pages.
Dietz, Paul H., et al., "A Practical Pressure Sensitive Computer Keyboard", In Proceedings of UIST 2009,(Oct. 2009), 4 pages.
Diverdi, et al., "An Immaterial Pseudo-3D Display with 3D Interaction", *In the proceedings of Three-Dimensional Television: Capture, Transmission, and Display, Springer*, Retrieved from <http://www.cs.ucsb.edu/~holl/pubs/DiVerdi-2007-3DTV.pdf>,(Feb. 6, 2007), 26 pages.
Glatt, Jeff "Channel and Key Pressure (Aftertouch).", Retrieved from: <http://home.roadrunner.com/~jgglatt/tutr/touch.htm> on Jun. 11, 2012, 2 pages.
Grossman, et al., "Multi-Finger Gestural Interaction with 3D Volumetric Displays", *In the proceedings of the 17th annual ACM symposium on User interface software and technology*, Retrieved from <http://www.dgp.toronto.edu/papers/tgrossman_UIST2004.pdf>,(Oct. 24, 2004), pp. 61-70.
Hanlon, Mike "ElekTex Smart Fabric Keyboard Goes Wireless", Retrieved from: <http://www.gizmag.com/go/5048/ > on May 7, 2012,(Jan. 15, 2006), 5 pages.
Izadi, Shahram et al., "ThinSight: A Thin Form-Factor Interactive Surface Technology", *Communications of the ACM*, vol. 52, No. 12, retrieved from <http://research.microsoft.com/pubs/132532/p90-izadi.pdf> on Jan. 5, 2012,(Dec. 2009), pp. 90-98.
Kaur, Sukhmani "Vincent Liew's redesigned laptop satisfies ergonomic needs", Retrieved from: <http://www.designbuzz.com/entry/vincent-liew-s-redesigned-laptop-satisfies-ergonomic-needs/> on Jul. 27, 2012,(Jun. 21, 2010), 4 pages.
Khuntontong, Puttachat et al., "Fabrication of Molded Interconnection Devices by Ultrasonic Hot Embossing on Thin Polymer Films", IEEE Transactions on Electronics Packaging Manufacturing, vol. 32, No. 3,(Jul. 2009), pp. 152-156.
Lee, C.M.G "Flat-Panel Autostereoscopic 3D Display", *Optoelectronics, IET*, Available at <http://ieeexplore.ieee.org/stamp/stamp.jsp?arnumber=04455550>,(Feb. 2008),pp. 24-28.
Lee, et al., "Depth-Fused 3D Imagery on an Immaterial Display", *In the proceedings of IEEE Transactions on Visualization and Computer Graphics*, vol. 15, No. 1, Retrieved from <http://ieeexplore.ieee.org/stamp/stamp.jsp?arnumber=04540094>,(Jan. 2009), 20-33.
Lee, et al., "LED Light Coupler Design for a Ultra Thin Light Guide", *Journal of the Optical Society of Korea*, vol. 11, Issue.3, Retrieved from <http://opticslab.kongju.ac.kr/pdf/06.pdf>,(Sep. 2007), 5 pages.
Linderholm, Owen "Logitech Shows Cloth Keyboard for PDAs", Retrieved from: <http://www.pcworld.com/article/89084/logitech_shows_cloth_keyboard_for_pdas.html> on May 7, 2012,(Mar. 15, 2002), 5 pages.
Liu, et al., "Three-dimensional PC: toward novel forms of human-computer interaction", *In the proceedings of Three-Dimensional Video and Display: Devices and Systems* vol. CR76, Retrieved from <http://www.google.co.in/url?sa=t&rct=j&q=Three-dimensional+PC:+toward+novel+forms+of+human-computer+interaction&source=web&cd=1&ved=0CFoQFjAA&url=http%3A%2F%2Fciteseerx.ist.psu.ed%2Fviewdoc%2Fdownload%3Fdoi%3D10.1.1.32.9469%26rep%3Drep1%26,(Nov. 5, 2000), pp. 250-281.
McLellan, Charles "Eleksen Wireless Fabric Keyboard: a first look", Retrieved from: <http://www.zdnetasia.com/eleksen-wireless-fabric-keyboard-a-first-look-40278954.htm> on May 5, 2012,(Jul. 17, 2006), 9 pages.
Peli, Eli "Visual and Optometric Issues with Head-Mounted Displays", *IS & T/OSA Optics & Imaging in the Information Age, The Society for Imaging Science and Technology*, available at <http://www.u.arizona.edu/~zrui3/zhang_pHMPD_spie07.pdf>,(1996), pp. 364-369.
Post, E.R. et al., "E-Broidery: Design and Fabrication of Textile-Based Computing", IBM Systems Journal, vol. 39, Issue 3 & 4,(Jul. 2000), pp. 840-860.
Purcher, Jack "Apple is Paving the Way for a New 3D GUI for IOS Devices", Retrieved from: <http://www.patentlyapple.com/patently-apple/2012/01/apple-is-paving-the-way-for-a-new-3d-gui-for-ios-devices.html> on Jun. 4, 2012,(Jan. 12, 2012), 15 pages.
Reisman, et al., "A Screen-Space Formulation for 2D and 3D Direct Manipulation", *In the proceedings of the 22nd annual ACM symposium on User interface*, Retrieved from <http://innovis.cpsc.ucalgary.ca/innovis/uploads/Courses/TableTopDetails2009/Reisman2009.pdf>,(Oct. 4, 2009), pp. 69-78.
Schoning, Johannes et al., "Building Interactive Multi-Touch Surfaces", *Journal of Graphics, GPU, and Game Tools*, vol. 14, No. 3, available at <http://www.libavg.com/raw-attachment/wiki/Multitouch/Multitouchguide_draft.pdf>,(Nov. 2009), pp. 35-55.
Takamatsu, Seiichi et al., "Flexible Fabric Keyboard with Conductive Polymer-Coated Fibers", In Proceedings of Sensors 2011,(Oct. 28, 2011), 4 pages.
Yan, Jin-Ren et al., "Edge-Lighting Light Guide Plate Based on Micro-Prism for Liquid Crystal Display", *Journal of Display Technology*, vol. 5, No. 9, Available at <http://ieeexplore.ieee.org/ielx5/9425/5196834/05196835.pdf?tp=&arnumber=5196835&isnumber=5196834>,(Sep. 2009), pp. 355-357.
Yu, et al., "A New Driving Scheme for Reflective Bistable Cholesteric Liquid Crystal Displays", *Society for Information Display International Symposium Digest of Technical Papers*, Retrieved from <http://www.ee.ust.hk/~eekwok/publications/1997/bcd_sid.pdf>,(May 1997), 4 pages.

(56) References Cited

OTHER PUBLICATIONS

Zhang, et al., "Model-Based Development of Dynamically Adaptive Software", *In Proceedings of ICSE 2006*, Available at <http://www.irisa.fr/lande/lande/icse-proceedings/icse/p371.pdf>,(May 20, 2006), pp. 371-380.
Zhang, Rui "Design of Head Mounted Displays", Retrieved at <<http://www.optics.arizona.edu/optomech/student%20reports/2007/Design%20of%20mounteddisplays%20Zhang.pdf>>, (Dec. 12, 2007), 6 pages.
Final Office Action, U.S. Appl. No. 13/408,257, Mar. 28, 2014, 17 pages.
Foreign Office Action, CN Application No. 201320328022.1, Oct. 18, 2013, 3 Pages.
Foreign Office Action, CN Application No. 201320328022.1, Feb. 17, 2014, 4 Pages.
Non-Final Office Action, U.S. Appl. No. 13/494,722, May 9, 2014, 8 pages.
Non-Final Office Action, U.S. Appl. No. 13/492,232, Apr. 30, 2014, 9 pages.
International Search Report and Written Opinion, Application No. PCT/US2014/020050, May 9, 2014, 10 pages.
International Search Report and Written Opinion, Application No. PCT/US2014/016654, May 16, 2014, 11 pages.
International Search Report and Written Opinion, Application No. PCT/US2013/075180, May 6, 2014, 12 pages.
Non-Final Office Action, U.S. Appl. No. 13/408,257, Jul. 2, 2014, 20 pages.
Non-Final Office Action, U.S. Appl. No. 13/647,507, Jun. 19, 2014, 22 pages.
Non-Final Office Action, U.S. Appl. No. 13/714,401, Jul. 8, 2014, 11 pages.
Non-Final Office Action, U.S. Appl. No. 13/773,496, Jun. 23, 2014, 10 pages.
PCT Search Report and Written Opinion, Application No. PCT/US2013/028479, (Jun. 17, 2013),10 pages.
PCT Search Report, Application No. PCT/US2013/042790, (Aug. 8, 2013), 9 pages.
Notice of Allowance, U.S. Appl. No. 12/882,994, (Jul. 12, 2013), 9 pages.
Chinese Search Report, Application No. 201110272868.3, (Apr. 1, 2013),10 pages.
International Search Report and Written Opinion, Application No. PCT/US2013/042550, (Sep. 24, 2013),14 pages.
"Welcome to Windows 7", Retrieved from: <http://www.microsoft.com/en-us/download/confirmation.aspx?id=4984> on Aug. 1, 2013, (Sep. 16, 2009), 3 pages.
Prospero, Michael "Samsung Outs Series 5 Hybrid PC Tablet", Retrieved from: <http://blog.laptopmag.com/samsung-outs-series-5-hybrid-pc-tablet-running-windows-8> on Oct. 31, 2013, (Jun. 4, 2012), 7 pages.
"For any kind of proceeding 2011 springtime as well as coil nailers as well as hotter summer season", Retrieved at <<http://www.ladyshoesworld.com/2011/09/18/for-any-kind-of-proceeding-2011-springtime-as-well-as-coil-nailers-as-well-as-hotter-summer-season/>> Sep. 18, 2011, pp. 2.
Travis, et al., "Flat Projection for 3-D", Retrieved at <<http://ieeexplore.ieee.org/stamp/stamp.jsp?arnumber=01605201>> In the Proceedings of the IEEE, vol. 94, No. 3, Mar. 3, 2006, pp. 539-549.
"Microsoft Develops Glasses-Free Eye-Tracking 3D Display", Retrieved at <<http://www.tech-faq.com/microsoft-develops-glasses-free-eye-tracking-3d-display.html>> Retrieved Date: Nov. 2, 2011, pp. 3.
Final Office Action, U.S. Appl. No. 13/492,232, Nov. 17, 2014, 13 pages.
Final Office Action, U.S. Appl. No. 13/647,507, Oct. 27, 2014, 33 pages.
Final Office Action, U.S. Appl. No. 13/714,401, Nov. 25, 2014, 15 pages.
Final Office Action, U.S. Appl. No. 13/773,496, Nov. 4, 2014, 11 pages.
Non-Final Office Action, U.S. Appl. No. 13/786,233, Nov. 20, 2014, 13 pages.
Written Opinion, Application No. PCT/US2014/020050, Sep. 22, 2014, 6 Pages.
"Final Office Action", U.S. Appl. No. 13/408,257, Dec. 10, 2014, 15 pages.
"Non-Final Office Action", U.S. Appl. No. 13/492,232, Feb. 24, 2015, 12 pages.
"Non-Final Office Action", U.S. Appl. No. 13/647,507, Feb. 9, 2015, 37 pages.
"Notice of Allowance", U.S. Appl. No. 13/494,722, Dec. 18, 2014, 7 pages.
"Advisory Action", U.S. Appl. No. 13/408,257, Apr. 8, 2015, 9 pages.
"Non-Final Office Action", U.S. Appl. No. 13/714,401, Apr. 17, 2015, 14 pages.

\* cited by examiner

VIRTUAL IMAGE DEVICE

BACKGROUND

A virtual image can be made by pointing a video projector into a lens to project the virtual image from a surface of the lens. A pair of eyeglasses, or spectacles, can include a virtual image projector to project a virtual image in front of the eyes of a wearer of the eyeglasses. Virtual image projectors small enough to be placed on a pair of eyeglasses, however, typically project a virtual image with a narrow field-of-view.

SUMMARY

This document describes various apparatuses embodying, and techniques for implementing, a virtual image device. The virtual image device includes a projector and a lens configured to generate a virtual image as well as two diffraction gratings, substantially orthogonally-oriented to each other, that act to increase a field-of-view of the virtual image. The virtual image device can be implemented as a pair of eyeglasses and controlled to generate the virtual image in front of lenses of the eyeglasses so that a wearer of the eyeglasses sees the virtual image. This summary is provided to introduce simplified concepts in a simplified form that are further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of a virtual image device are described with reference to the following drawings. The same numbers are used throughout the drawings to reference like features and components.

DETAILED DESCRIPTION

Overview

Figure 1:
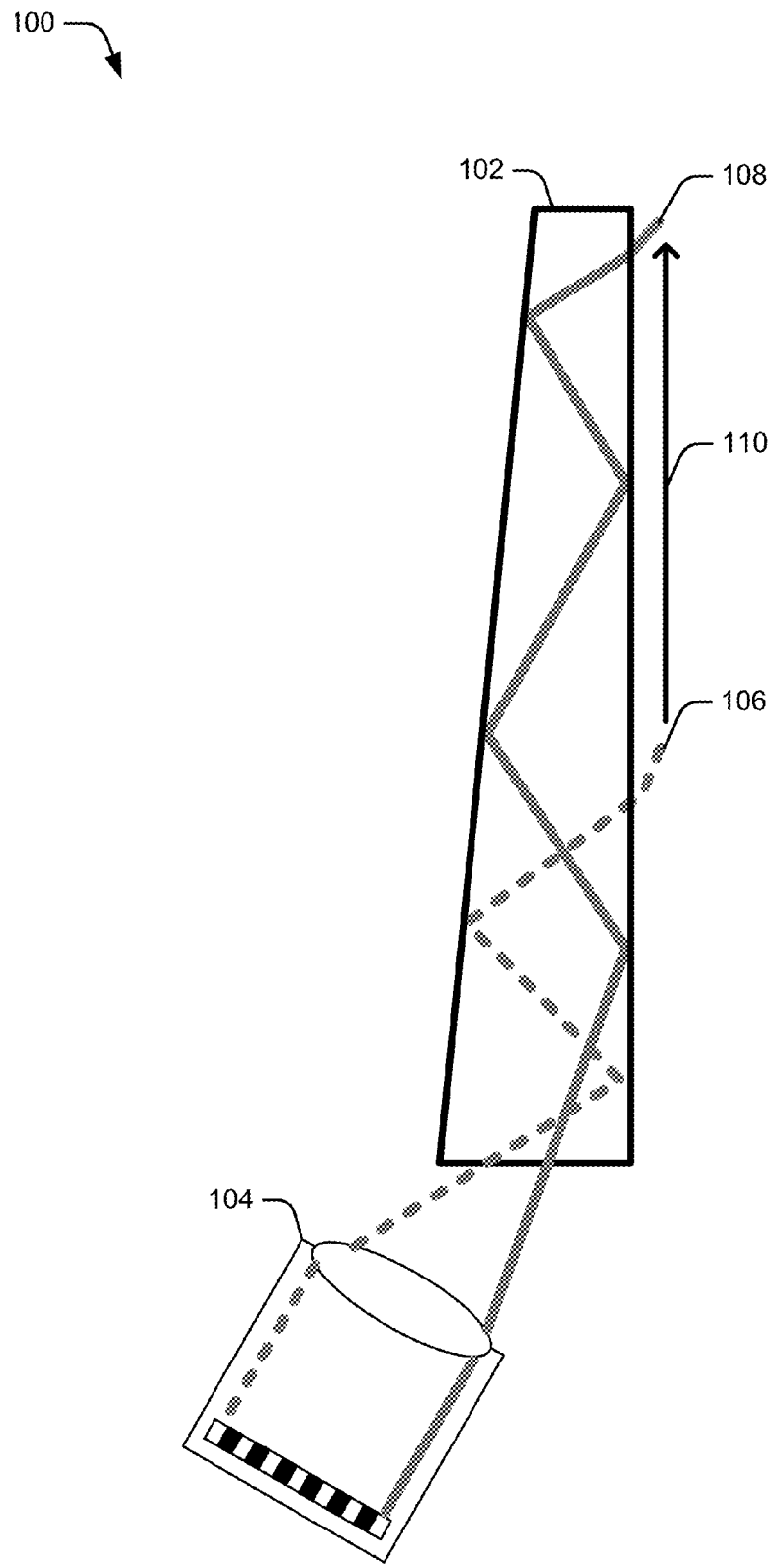
FIG. 1 illustrates an example environment of a projector and a wedge light guide configured to generate a virtual image.

It is well know that if a picture is placed in the focal plane of a lens, and an eye looks through the lens from its other focal plane, that the eye will see a virtual image. This arrangement, however, is bulky and unsuitable for integration into a pair of eyeglasses and other slim devices. A wedge light guide is a lens with a focal plane at one end of the light guide so that the arrangement is slim. Consider for example, FIG. 1, which illustrates an example embodiment 100 of a wedge light guide 102 and a projector 104. Projector 104 projects light rays 106 and 108 into the thick end of the wedge light guide causing the light rays to reflect back and forth at progressively steeper angles until a "critical angle" is reached, at which point the light rays exit the wedge light guide causing a projected image 110 to emerge from the face of the wedge.

However, a wedge light guide, by itself, is unsuitable to generate virtual images when coupled to a pair of eyeglasses for the following reasons: 1) the focal plane of the wedge light guide is one dimensional making it difficult to project a large virtual image, 2) the focal length of the wedge light guide is too large, and 3) the field-of-view of a virtual image projected by the wedge light guide is too narrow.

This document describes various apparatuses embodying, and techniques for implementing, a virtual image device. This virtual image device includes a projector and a lens configured to generate a virtual image, such as a wedge light guide type of lens. In some embodiments, the lens is a wedge light guide. The virtual image device further includes two diffraction gratings, substantially orthogonally-oriented to each other, that act to increase a field-of-view of the virtual image. The two diffraction gratings can include a horizontal liquid crystal diffraction grating configured to increase a vertical field-of-view of the virtual image and a vertical liquid crystal diffraction grating configured to increase a horizontal field-of-view of the virtual image. The virtual image device may be implemented as a pair of eyeglasses and controlled to generate the virtual image for a wearer of the eyeglasses.

Example Environment

Figure 2:
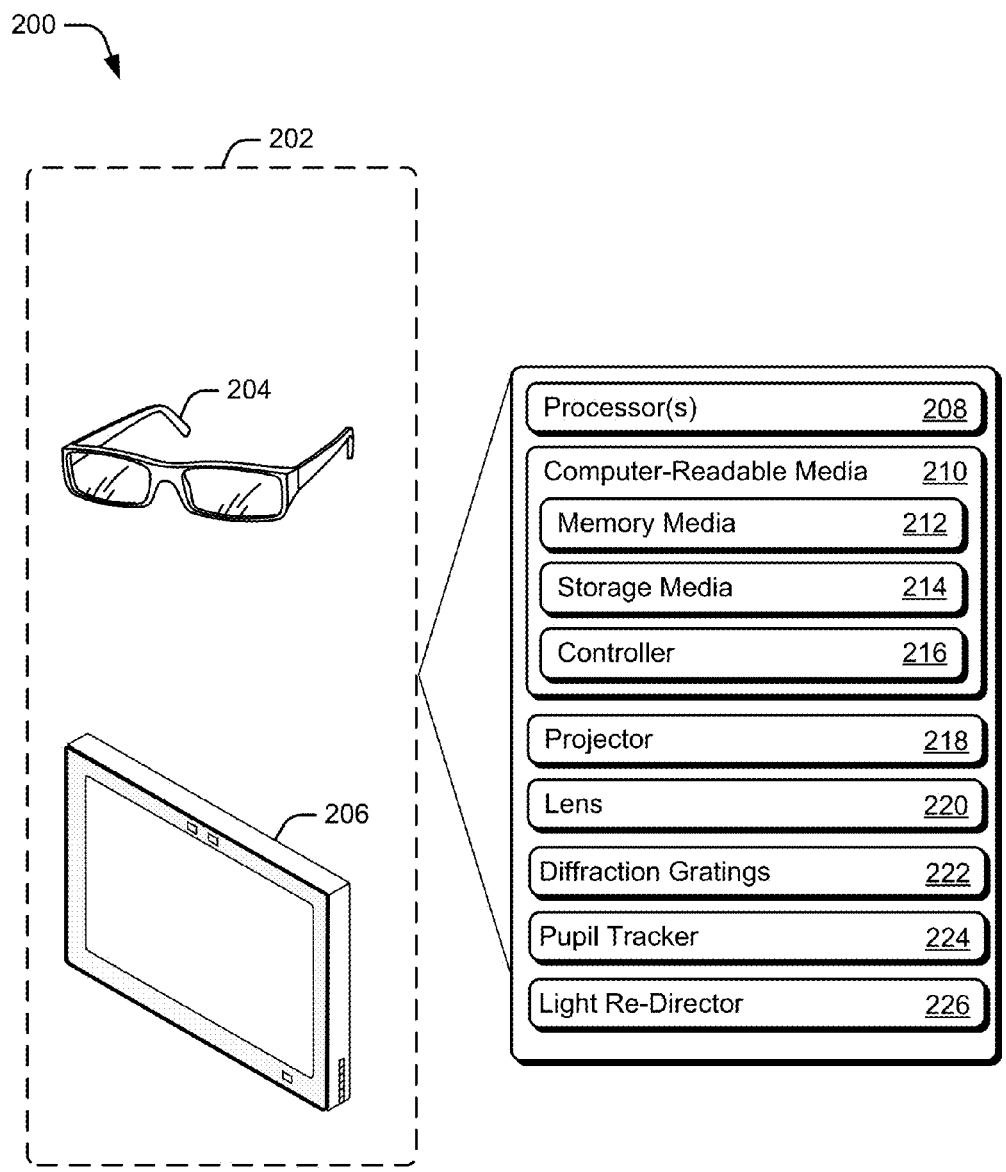
FIG. 2 illustrates an example environment in which a virtual image device can be implemented.

FIG. 2 is an illustration of an example environment 200 in which a virtual image device can be implemented. Environment 200 can be implemented in a virtual image device 202, which is illustrated, by way of example and not limitation, as a pair of eyeglasses 204. Eyeglasses 204 can include sunglasses, spectacles, goggles, or any other type of head-mounted display device. While virtual image device 202 will be described as being implemented as a pair of eyeglasses 204, it is to be noted that virtual image device may also be implemented as any other type of virtual image display device that can generate three-dimensional (3D) and/or multi-view images, such as a television device 206.

Virtual image device 202 includes processor(s) 208 and computer-readable media 210, which includes memory media 212 and storage media 214. Computer-readable media 210 also includes a controller 216. How controller 216 is implemented and used varies, and is described as part of the methods discussed below.

Virtual image device 202 includes a projector 218 and a lens 220 that can be controlled by controller 216 to generate a virtual image that can be viewed by a wearer of eyeglasses 204, referred to as "viewer" herein. The frame of a pair of eyeglasses may be slightly curved, which may render regular projectors unsuitable. Therefore, in some embodiments, projector 218 is a holographic projector that can be controlled to adjust to the curvature of a pair of eyeglasses. In some embodiments, lens 220 can be implemented as a wedge light guide. As described herein, the term "wedge light guide" describes a wedge-shaped lens or light guide that permits light input into the wedge light guide to fan out within the wedge light guide via total internal reflection before reaching a critical angle for internal reflection and exiting via another surface of the wedge light guide. The light may exit the wedge light guide at a glancing angle relative to the viewing surface of the wedge light guide to generate a virtual image.

Virtual image device 202 further includes two diffraction gratings 222, substantially orthogonally-oriented to each other, configured to increase a field-of-view of the virtual image. As described herein, the term "diffraction gratings" includes any type of diffractive optical element. In some embodiments, the diffraction gratings comprise liquid crystal diffraction gratings. Projector 218, lens 220, and diffraction gratings 222 may be coupled to lenses of eyeglasses 204 to generate a virtual image of infinitely distant objects directly in front of the viewer's eye to cause a pupil of the viewer's eye to adjust to an infinite or near-infinite focal length to focus on the objects. Projector 218 may be at least partially transparent so that the viewer can see external objects as well as virtual images when looking through the lenses of eyeglasses 204. In addition, it is to be appreciated that projector 218 may be small enough to fit onto the lenses of eyeglasses 204 without being noticeable to the viewer.

In some embodiments, projector 218 can be implemented as two projectors to generate a virtual image in front of each of the viewer's eyes. When two projectors are used, each projector 218 can project the same virtual image concurrently so that the viewer's right eye and left eye receive the same image at the same time. Alternately, the projectors may project slightly different images concurrently, so that the viewer receives a stereoscopic image (e.g., a three-dimensional image).

In some embodiments, virtual image device 202 may also include a pupil tracker 224 that locates and tracks positions of the pupils of the viewer. Pupil tracker 224 provides these positions to controller 216 to enable the controller to control virtual image device 202 to render the virtual image based on the positions of the pupils of the viewer. For example, controller 216 can control virtual image device 202 to generate a virtual image that concentrates through pupils of a viewer. In some embodiments, pupil tracker 224 is further configured to determine a change in the positions of the pupils. For example, pupil tracker 224 can determine when the pupils move left, right, up, or down. Pupil tracker 224 provides this change in the positions of the pupils to controller 216 to enable controller 216 to control virtual image device 202 to generate the virtual image based on the change in the positions of the pupils.

In some cases, pupil tracker 224 includes an infrared-sensitive camera and a synchronously modulated infra-red LED. Pupil tracker 224 locates the positions of the pupils by taking a picture of the viewer with a flash and identifying "red eye" caused by the flash to locate the positions of the pupils. For example, the positions of the pupils, as indicated by the red eye, can be identified in an otherwise low contrast infra-red image of the viewer's face.

In some cases, virtual image device 202 includes light re-director 226, which is located adjacent to a viewing surface of lens 220 to diffuse collimated light emitted by lens 220. This collimated light may exit lens 220 at a glancing angle with respect to the viewing surface. Thus, light re-director 226 can re-direct the emitted light of lens 220 towards the pupils of a viewer and may provide a diffusing function in one dimension. Light re-director 226 can be configured as any suitable structure, such as a turning film of prisms or a light-guide panel having a prismatic textured surface. By varying angles of prisms or prismatic features over a surface of light re-director 226, light re-director 226 can be configured to have optical power capable of directing the collimated light emitted from the viewing surface of lens 220 towards the pupils of the viewer.

In order to generate a virtual image, light rays from projector 218 are deflected as the light rays exit lens 220 so that the light rays concentrate through each pupil of the viewer. A two-dimensional liquid crystal display (LCD), which modulates light rays in both the vertical and horizontal directions, can be configured to deflect the light rays to concentrate through each pupil of the viewer. For example, a two-dimensional LCD can be controlled to alternate between being opaque and transparent so that it acts like a diffraction grating. Alternately, the LCD can be configured to modulate the phase of light so it acts like a blazed diffraction grating. Conventional LCDs, however, have pixels no smaller than five microns so the deflection angle is only a few degrees. This small deflection angle can cause a small virtual image to be generated. Furthermore, two-dimensional LCDs may use an active matrix of transistors. When the LCDs are opaque, the transistors cause aperture diffraction of external light coming from the outside world. Accordingly, in accordance with various embodiments, virtual image device 202 uses two diffraction gratings 222, substantially orthogonally-oriented to each other, to deflect light rays leaving lens 220 to cause the light rays to concentrate through the pupils of the viewer.

In an embodiment, the two liquid crystal diffraction gratings 222 can be positioned behind an LCD of virtual image device 202 to scan the illumination of the LCD. Using two liquid crystal diffraction gratings 222 to scan the illumination separate from the LCD enables virtual image device 202 to be equipped with a low resolution LCD because the LCD does not need to scan the image.

Figure 3:
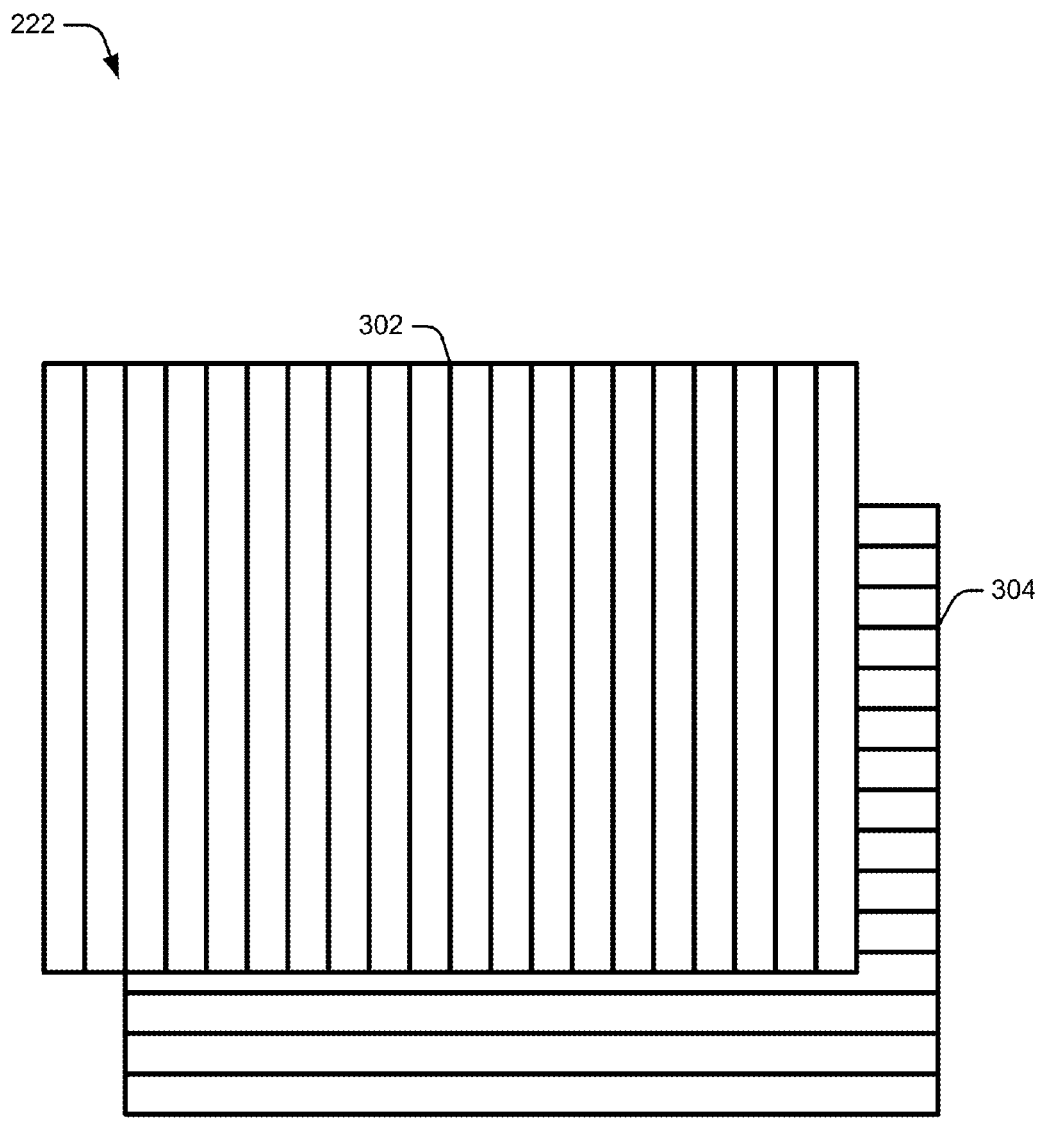
FIG. 3 is a detailed example of two liquid crystal diffraction gratings that are substantially orthogonally-oriented to each other.

FIG. 3 illustrates a detailed example of two diffraction gratings 222 that are substantially orthogonally-oriented to each other. In some embodiments, the two diffraction gratings are passive liquid crystal diffraction gratings that do not require transistors to modulate light rays. By eliminating the need for transistors, the passive liquid crystal diffraction gratings will have substantially less unwanted diffraction of external light. Each of the two liquid crystal diffraction gratings 222 are configured to scan light rays in a single direction (e.g., vertically or horizontally). Scanning light rays in a single direction is known in the art, and is not discussed in detail herein.

Liquid crystal diffraction gratings 222, in this example, include vertical liquid crystal diffraction grating 302 and horizontal liquid crystal diffraction grating 304, which are substantially orthogonally-oriented to each other. Vertical liquid crystal diffraction grating 302 includes vertical diffraction gratings to scan the virtual image horizontally (e.g., side to side). Horizontal liquid crystal diffraction grating 304 includes horizontal diffraction gratings to scan the virtual image vertically (e.g., up and down). By aligning vertical liquid crystal diffraction grating 302 orthogonal to horizontal liquid crystal diffraction grating 304, the virtual image can be separately scanned at a large angle in both the horizontal and vertical directions. The two liquid crystal diffraction gratings, therefore, increase the field-of-view of the virtual image on both a horizontal and a vertical plane to generate a virtual image with a wide field-of-view.

Figure 4:
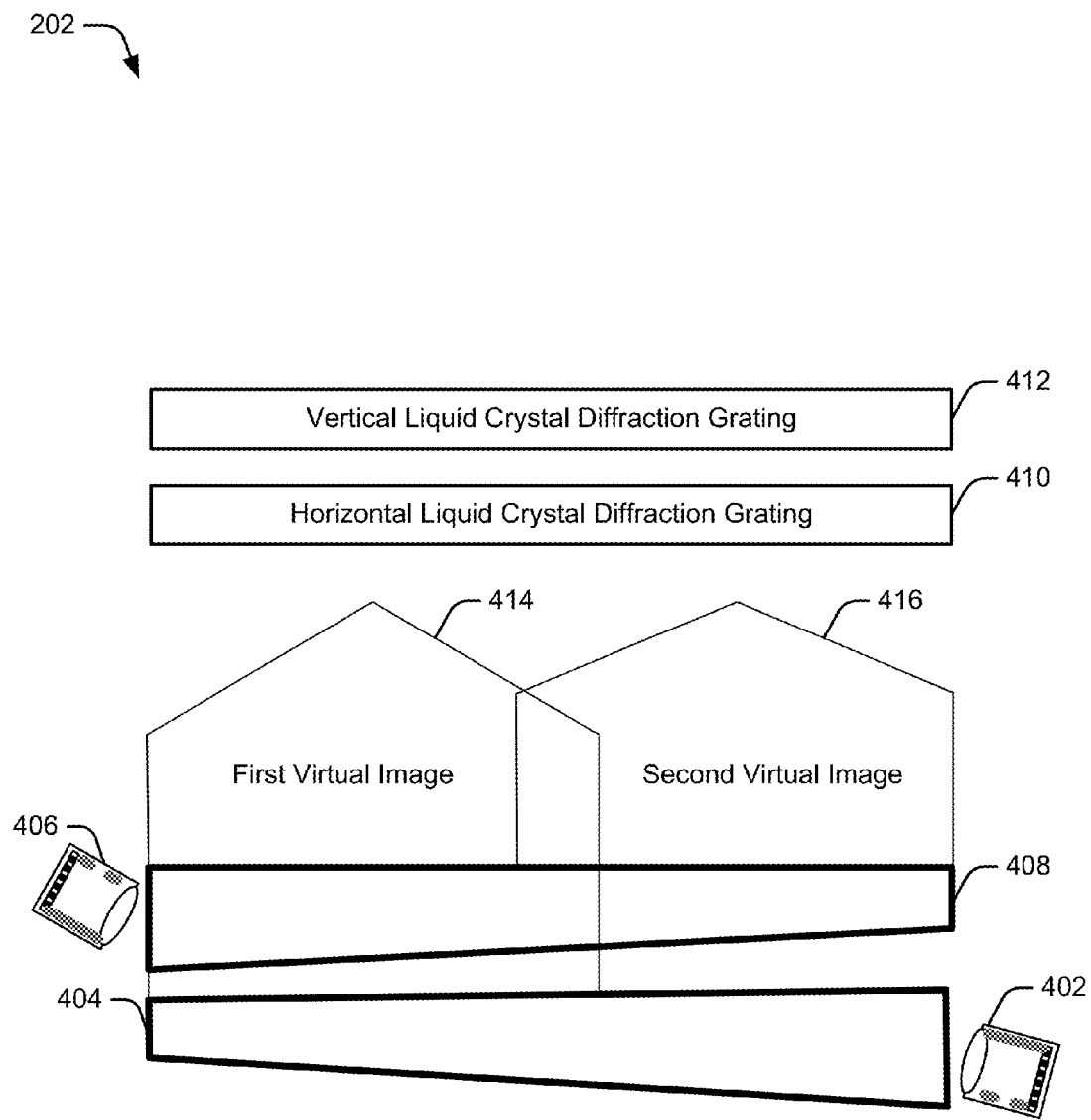
FIG. 4 is a more-detailed example of a virtual image device.

FIG. 4 illustrates a detailed example of virtual image device 202 in accordance with various embodiments. In this example, virtual image device 202 includes a first projector 402 that injects light into a first wedge light guide 404, a second projector 406 that injects light into a second wedge light guide 408, a horizontal liquid crystal diffraction grating 410, and a vertical liquid crystal diffraction grating 412. In this example, horizontal liquid crystal diffraction grating 410 is between the wedges and vertical liquid crystal diffraction grating 412. Alternately, the positions of the diffraction gratings can be switched so that vertical liquid crystal diffraction grating 412 is between the wedges and horizontal liquid crystal diffraction grating 410. Light injected by first projector 402 into first light guide 404 generates a first virtual image 414 that can be viewed by a right eye of the viewer. Light injected by second projector 406 into second wedge light guide 408 generates a second virtual image 416 that can be viewed by a left eye of the viewer.

Horizontal liquid crystal diffraction grating 410 receives first virtual image 414 and second virtual image 416 and increases the vertical field-of-view of the first virtual image and the second virtual image by scanning the virtual images in the vertical direction. Vertical liquid crystal diffraction grating 412 receives first virtual image 414 and second virtual image 416 and increases the horizontal field-of-view of the first virtual image and the second virtual image by scanning the virtual images in the horizontal direction. In some embodiments, first virtual image 414 and second virtual image 416 are the same virtual image so that the right eye and left eye of the viewer see the same virtual image. Alternately, first virtual image 414 and second virtual image 416 may be slightly different virtual images, so that the viewer receives a stereoscopic image.

Figure 5:
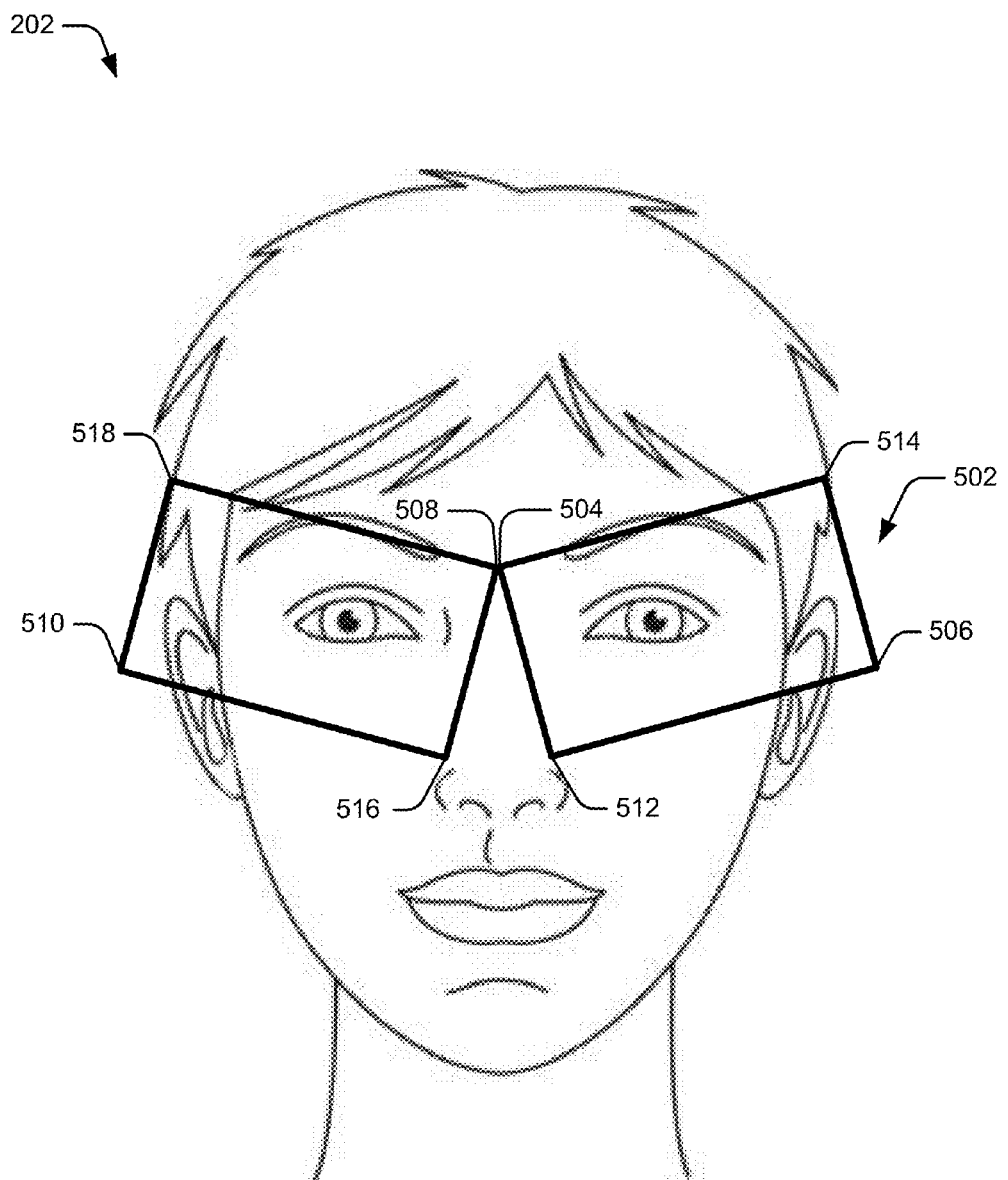
FIG. 5 is another more-detailed example of virtual image device when implemented as a pair of rectangular eyeglasses in accordance with one embodiment.

In some embodiments, virtual image device 202 can be implemented as rectangular eyeglasses with rectangular lenses to further increase the field-of-view of virtual images projected by virtual image device 202. FIG. 5 illustrates an example of virtual image device 202 when implemented as rectangular eyeglasses 502. In this example the lenses of rectangular eyeglasses 502 are tilted, relative to a face of a wearer of the eyeglasses, to take advantage of the diagonal from corners 504 to 506, from corners 508 to 510, from corners 512 to 514, and from corners 516 to 518 of rectangular eyeglasses 502 to maximize the field-of-view of virtual images generated by the eyeglasses. In other words, by tilting the glasses, a wider viewing surface is created because the length of the diagonal of a rectangle is longer than the length of either side of the rectangle.

Additionally, by tilting rectangular eyeglasses 502 relative to the wearer's face, a converged area is created below the nose of the wearer of the eyeglasses, which can be used to display virtual images for hand-eye-coordination tasks. For example, corners 512 and 516 create a stereo area where each eye of the wearer can look down to where the wearer's hands typically are located to give an extended stereo area to display virtual images for hand-eye-coordination tasks. The configuration of rectangular eyeglasses 502 also creates "heads up" zones at the upper corners 504, 508, 514, and 518, which enables display of information that is out of the way of the wearer's primary focus of interest. For example, corners 504 and 508 enable the field-of-view for each eye of the wearer to extend across the nose to create a stereo area where each eye can look across the nose to see what the other eye sees. Corners 514 and 518, located at the upper outer corners of rectangular eyeglasses 502, provide an extended heads up display area.

Example Method

Figure 6:
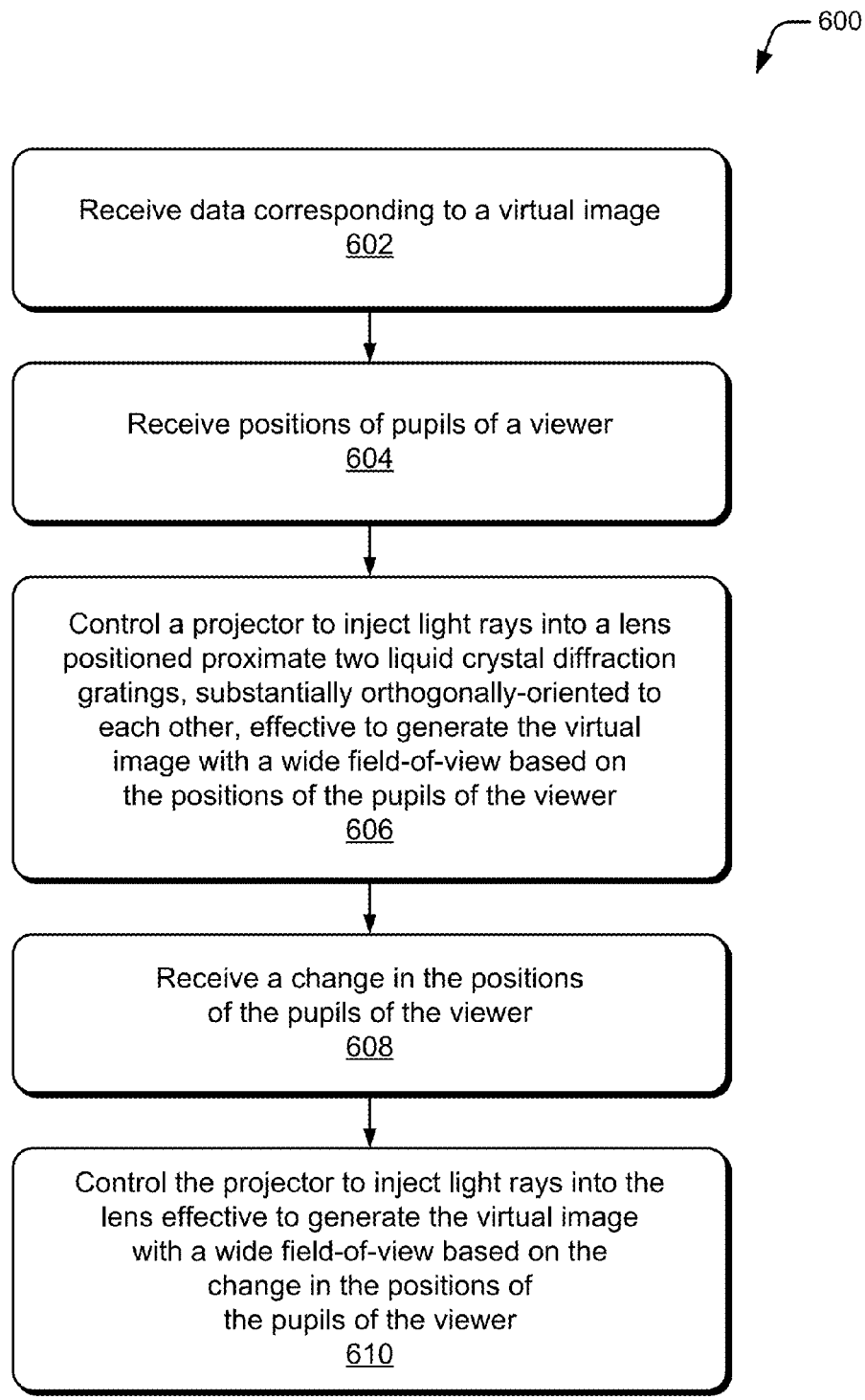
FIG. 6 illustrates an example method for controlling a virtual image device to generate a virtual image.

FIG. 6 is flow diagram depicting an example method 600 for controlling a virtual image device to generate a virtual image. Block 602 receives data corresponding to a virtual image (e.g., video data corresponding to a movie or to television programming) Block 604 receives positions of pupils of a viewer. For example, controller 216 receives the positions of the pupils of the viewer from pupil tracker 224.

Block 606 controls a projector to inject light rays into a lens positioned proximate two liquid crystal diffraction gratings, substantially orthogonally-oriented to each other, effective to generate the virtual image with a wide field-of-view based on the positions of the pupils of the viewer. For example, controller 216 controls projector 218 to inject light rays into lens 220 positioned proximate two liquid crystal diffraction gratings 222 effective to generate the virtual image with a wide field-of-view based on the positions of the pupils of the viewer.

Block 608 receives a change in the positions of the pupils of the viewer. Block 610 controls the projector to inject light rays into the lens effective to generate the virtual image with a wide field-of-view based on the change in the positions of the pupils of the viewer. For example, controller 216 controls projector 218 to inject light rays into lens 220 positioned proximate the two liquid crystal diffraction gratings 222 effective to generate the virtual image with a wide field-of-view based on the change in the positions of the pupils of the viewer.

Example Device

Figure 7:
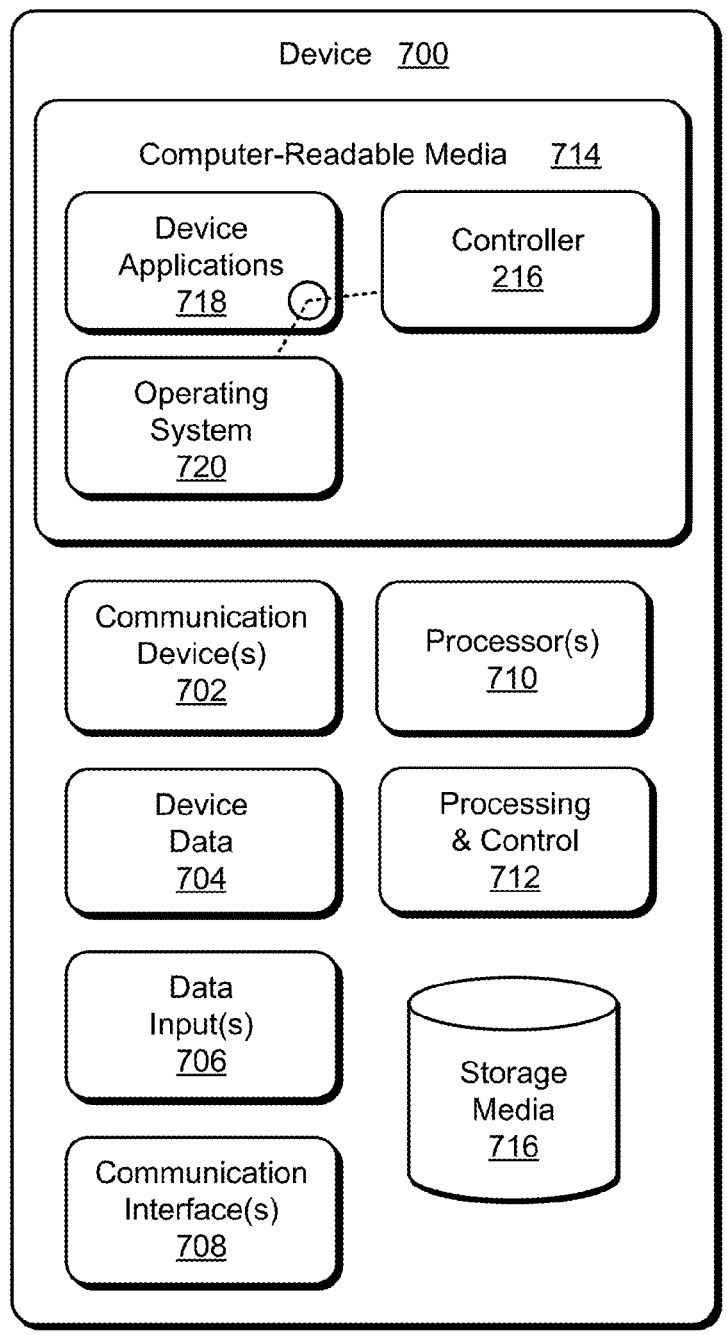
FIG. 7 illustrates an example device in which techniques for a virtual image device can be implemented.

FIG. 7 illustrates various components of example device 700 that can be implemented as any type of client, server, and/or display device as described with reference to the previous FIGS. 1-6 to implement apparatuses embodying, and techniques enabling, a virtual image device. In embodiments, device 700 can be implemented as one or a combination of a wired and/or wireless device, a head-mounted display device (e.g., eyeglasses, sunglasses, etc.) as a form of flat panel display, television, television client device (e.g., television set-top box, digital video recorder (DVR), etc.), consumer device, computer device, server device, portable computer device, user device, communication device, video processing and/or rendering device, appliance device, gaming device, electronic device, and/or as another type of device. Device 700 may also be associated with a viewer (e.g., a person or user) and/or an entity that operates the device such that a device describes logical devices that include users, software, firmware, and/or a combination of devices.

Device 700 includes communication devices 702 that enable wired and/or wireless communication of device data 704 (e.g., received data, data that is being received, data scheduled for broadcast, data packets of the data, etc.). The device data 704 or other device content can include configuration settings of the device, media content stored on the device, and/or information associated with a user of the device. Media content stored on device 700 can include any type of audio, video, and/or image data. Device 700 includes one or more data inputs 706 via which any type of data, media content, and/or inputs can be received, such as user-selectable inputs, messages, music, television media content, recorded video content, and any other type of audio, video, and/or image data received from any content and/or data source.

Device 700 also includes communication interfaces 708, which can be implemented as any one or more of a serial and/or parallel interface, a wireless interface, any type of network interface, a modem, and as any other type of communication interface. The communication interfaces 708 provide a connection and/or communication links between device 700 and a communication network by which other electronic, computing, and communication devices communicate data with device 700.

Device 700 includes one or more processors 710 (e.g., any of microprocessors, controllers, and the like), which process various computer-executable instructions to control the operation of device 700 and to enable techniques for implementing a virtual image device. Alternatively or in addition, device 700 can be implemented with any one or combination of hardware, firmware, or fixed logic circuitry that is implemented in connection with processing and control circuits, which are generally identified at 712. Although not shown, device 700 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 700 also includes computer-readable storage media 714, such as one or more memory devices that enable persistent and/or non-transitory data storage (i.e., in contrast to mere signal transmission), examples of which include random access memory (RAM), non-volatile memory (e.g., any one or more of a read-only memory (ROM), non-volatile RAM (NVRAM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 700 can also include a mass storage media device 716.

Computer-readable storage media 714 provides data storage mechanisms to store the device data 704, as well as various device applications 718 and any other types of information and/or data related to operational aspects of device 700. For example, an operating system 720 can be maintained as a computer application with the computer-readable storage media 714 and executed on processors 710. The device applications 718 may include a device manager, such as any form of a control application, software application, signal-processing and control module, code that is native to a particular device, a hardware abstraction layer for a particular device, and so on.

The device applications 718 also include any system components or modules to implement techniques using or enabling a virtual image device. In this example, the device applications 718 can include controller 216 for controlling a virtual image device.

Conclusion

This document describes various apparatuses embodying, and techniques for implementing, a virtual image device. Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A virtual image device comprising: a projector configured to output light rays; a lens configured to receive the light rays from the projector and to generate a virtual image; and two diffraction gratings, positioned proximate the lens, to increase a field-of-view of the virtual image, the two diffraction gratings substantially orthogonally-oriented to each other, a first diffraction grating of the two diffraction gratings configured to increase a vertical field-of-view of the virtual image and a second diffraction grating of the two diffraction gratings configured to increase a horizontal field-of-view of the virtual image.

2. The virtual image device as described in claim 1, wherein the two diffraction gratings comprise passive liquid crystal diffraction gratings.

3. The virtual image device as described in claim 2, wherein the virtual image device comprises a pair of eyeglasses, and wherein the projector, the lens, and the two passive liquid crystal diffraction gratings are coupled to the pair of eyeglasses to generate the virtual image for a wearer of the pair of eyeglasses.

4. The virtual image device as described in claim 1, wherein the first diffraction grating comprises a horizontal diffraction grating, and wherein the second diffraction grating comprises a vertical diffraction grating.

5. A virtual image device as described in claim 1, wherein the virtual image device comprises a pair of eyeglasses, and wherein lenses of the pair of eyeglasses are rectangular, and tilted relative to a face of the wearer, to maximize the vertical field-of-view and the horizontal field-of-view of the virtual image.

6. The virtual image device as described in claim 1, wherein the virtual image device comprises a three-dimensional display device or a multi-view display device.

7. The virtual image device as described in claim 1, further comprising a pupil tracker configured to locate positions of pupils of a viewer, wherein the virtual image device is controlled to generate the virtual image based on the positions of the pupils.

8. The virtual image device as described in claim 7, further comprising a light re-director to deflect the virtual image based on the positions of the pupils of the viewer.

9. The virtual image device as described in claim 1, wherein the lens comprises a wedge light guide, the wedge light guide configured to receive the light rays from the projector and to generate the virtual image by projecting the virtual image from a surface of the wedge light guide.

10. The virtual image device as described in claim 1, wherein the lens is further configured to generate the virtual image for a first eye of a viewer and the virtual image device further comprises:
an additional projector configured to output additional light rays; and
an additional lens configured to receive the additional light rays from the additional projector and to generate an additional virtual image for a second eye of the viewer.

11. The virtual image device as described in claim 1, wherein the projector is at least partially transparent.

12. The virtual image device as described in claim 1, wherein the projector comprises a holographic projector.

13. A head-mounted display device comprising:
a pupil tracker configured to locate a position of a first pupil and a position of a second pupil of a wearer of the head-mounted display device;
a first projector configured to inject light rays into a first wedge light guide effective to generate a first virtual image based on the position of the first pupil;
a second projector configured to inject light rays corresponding to the virtual image into a second wedge light guide effective to generate a second virtual image based on the position of the second pupil;
two liquid crystal diffraction gratings, substantially orthogonally-oriented to each other, comprising:
a horizontal liquid crystal diffraction grating configured to increase a vertical field-of-view of the first virtual image and the second virtual image; and
a vertical liquid crystal diffraction grating configured to increase a horizontal field-of-view of the first virtual image and the second virtual image.

14. The head-mounted display device as described in claim 13, wherein the head-mounted display device is a pair of eyeglasses.

15. The head-mounted display device as described in claim 13, wherein the head-mounted display device comprises a pair of eyeglasses, with rectangular lenses that are tilted relative to a face of the wearer, to further increase the vertical field-of-view and the horizontal field-of-view of the virtual image.

16. The head-mounted display device as described in claim 13, further comprising a turning film configured to direct the first virtual image to the first pupil and to direct the second virtual image to the second pupil.

17. A virtual image device comprising:
- a pupil tracker configured to locate positions of pupils of a viewer;
- a projector configured to output light rays;
- a lens configured to receive the light rays from the projector and to generate a virtual image based on the position of the pupils of the viewer; and
- two diffraction gratings, positioned proximate the lens, to increase a field-of-view of the virtual image, the two diffraction gratings substantially orthogonally-oriented to each other.

18. The virtual image device as described in claim 17, further comprising a light re-director to deflect the virtual image based on the positions of the pupils of the viewer.

19. The virtual image device as described in claim 17, wherein the lens comprises a wedge light guide, the wedge light guide configured to receive the light rays from the projector and to generate the virtual image by projecting the virtual image from a surface of the wedge light guide.

20. The virtual image device as described in claim 17, wherein the virtual image device comprises a head-mounted display device.

* * * * *